United States Patent [19]

Rosenzweig et al.

[11] Patent Number: 4,853,165
[45] Date of Patent: Aug. 1, 1989

[54] METHOD OF USING HEAT-RECOVERABLE ARTICLES COMPRISING CONDUCTIVE POLYMER COMPOSITIONS

[75] Inventors: Nachum Rosenzweig, Palo Alto; Pravin L. Soni, Union City, both of Calif.

[73] Assignee: Raychem Corporation, Menlo Park, Calif.

[21] Appl. No.: 67,679

[22] Filed: Jun. 26, 1987

Related U.S. Application Data

[63] Continuation-in-part of Ser. No. 720,117, Apr. 2, 1985, Pat. No. 4,775,501, which is a continuation-in-part of Ser. No. 596,761, Apr. 4, 1984, abandoned.

[51] Int. Cl.$^4$ .............................................. B29C 61/02
[52] U.S. Cl. .................................... 264/27; 156/86; 219/535; 264/36; 264/104; 264/105; 264/230; 264/342 R
[58] Field of Search .................................. 264/25–27, 264/104–105, 230, 342 R, 120, 119, 36; 425/174.8 R, 174.8 E, 174.6; 219/548, 541, 535; 156/86, 87

[56] References Cited

U.S. PATENT DOCUMENTS

| | | | |
|---|---|---|---|
| 3,540,757 | 11/1970 | Neher | 264/300 |
| 3,658,976 | 5/1972 | Slade | 264/105 |
| 3,953,059 | 4/1976 | Carroll | 264/249 |
| 4,055,615 | 10/1977 | Ikeda | 264/105 |
| 4,070,044 | 1/1978 | Carrow | 156/86 |
| 4,085,286 | 4/1978 | Horsma et al. | 174/92 |
| 4,151,126 | 4/1979 | Adelman et al. | 252/508 |
| 4,177,446 | 12/1979 | Diaz | 338/212 |
| 4,179,319 | 12/1979 | Lofdahl | 264/342 R |
| 4,252,849 | 2/1981 | Nishimura et al. | 428/192 |
| 4,272,474 | 6/1981 | Crocker | 264/176 R |
| 4,304,616 | 12/1981 | Richardson | 264/230 |
| 4,362,684 | 12/1982 | Thalmann | 264/230 |
| 4,378,323 | 3/1983 | Brandeau | 264/27 |
| 4,386,629 | 6/1983 | Cook et al. | 156/86 |
| 4,390,745 | 6/1983 | Bottcher et al. | 156/86 |
| 4,404,010 | 9/1983 | Bricheno et al. | 264/230 |
| 4,419,156 | 12/1983 | Diaz et al. | 156/49 |
| 4,419,304 | 12/1983 | Ficke et al. | 264/25 |
| 4,421,582 | 12/1983 | Horsma et al. | 156/86 |
| 4,436,987 | 3/1984 | Thalmann et al. | 219/535 |
| 4,455,482 | 6/1984 | Grandclement | 264/27 |
| 4,467,002 | 8/1984 | Crofts | 264/230 |
| 4,497,760 | 2/1985 | Sorlien | 264/230 |
| 4,518,552 | 5/1985 | Matsuo et al. | 264/126 |
| 4,575,618 | 3/1986 | Rosenzweig | 156/86 |
| 4,586,970 | 5/1986 | Ishise et al. | 156/86 |
| 4,596,732 | 6/1986 | Diaz | 428/181 |
| 4,631,098 | 12/1986 | Pithouse et al. | 264/342 R |
| 4,686,071 | 8/1987 | Rosenzweig et al. | 264/104 |
| 4,707,388 | 11/1987 | Park et al. | 156/86 |

FOREIGN PATENT DOCUMENTS

| | | | |
|---|---|---|---|
| 705309 | 3/1965 | Canada | 264/230 |
| A0036963 | 5/1981 | European Pat. Off. . | |
| 0042262 | 6/1981 | European Pat. Off. . | |
| 2414077 | 10/1975 | Fed. Rep. of Germany | 264/230 |
| 2832119 | 2/1979 | Fed. Rep. of Germany . | |
| 3107489A | 9/1982 | Fed. Rep. of Germany . | |
| 56-95647 | 8/1981 | Japan | 264/230 |
| 57-56226 | 4/1982 | Japan | 264/25 |
| 58-81129 | 5/1983 | Japan | 264/25 |
| 1449539 | 9/1965 | United Kingdom . | |
| 1116878 | 6/1968 | United Kingdom . | |
| 1265194 | 3/1972 | United Kingdom . | |
| 2012149 | 7/1979 | United Kingdom . | |
| 2076489 | 12/1981 | United Kingdom . | |

*Primary Examiner*—Jeffery Thurlow
*Attorney, Agent, or Firm*—Timothy H. P. Richardson; Herbert G. Burkard

[57] ABSTRACT

Methods of modifying substrates, in particular joining pipes, especially pipes composed of glass fiber-reinforced polymers, make use of heat-recoverable conductive polymer articles. An insert is placed between the substrate and the article, and undergoes a desired chemical and/or physical change when the article is recovered. Preferably the insert is a fiber-reinforced thermosetting polymer which is cured in situ against the substrate. Preferably the conductive polymer is a sintered material or another material having good physical properties above its recovery temperature.

27 Claims, 1 Drawing Sheet

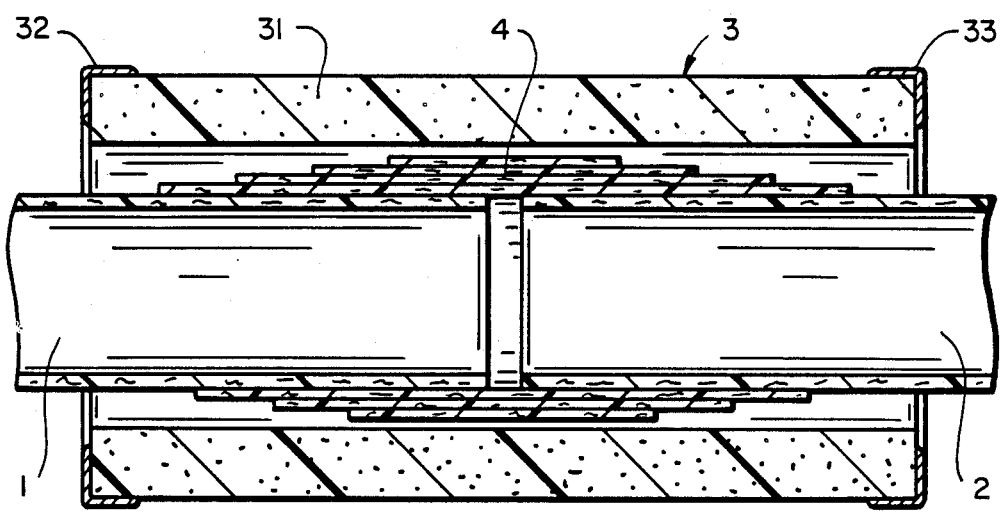
FIG_1
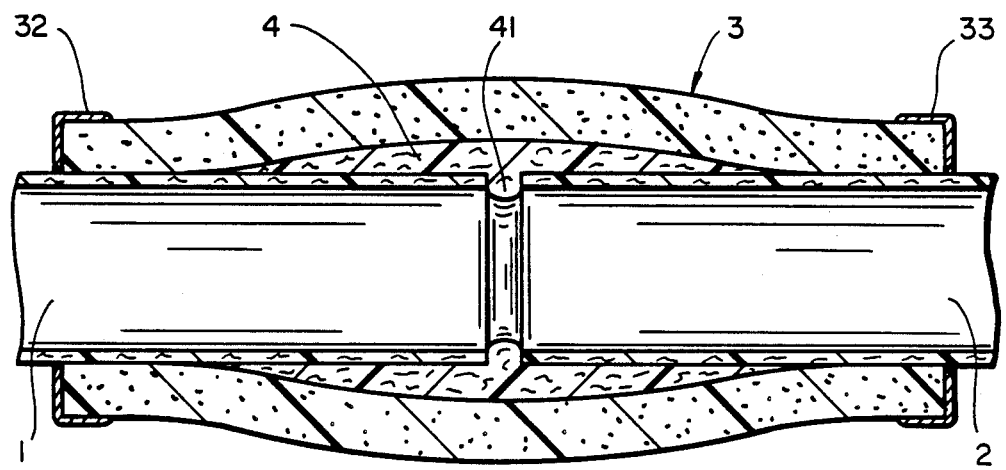
FIG_2

METHOD OF USING HEAT-RECOVERABLE ARTICLES COMPRISING CONDUCTIVE POLYMER COMPOSITIONS

This application is a continuation-in-part of application Ser. No. 720,117, filed Apr. 2, 1985, now U.S. Pat. No. 4,775,501 issued Oct. 4, 1988, which is itself a continuation-in-part of application Ser. No. 596,761, filed Apr. 4, 1984, now abandoned. The disclosure of each of those applications is incorporated herein by reference.

BACKGROUND OF THE INVENTION

Field of the Invention

This invention relates to the use of heat-recoverable articles comprising conductive polymer compositions for joining, repairing, reinforcing or otherwise modifying substrates, particularly pipes composed of an organic polymeric composition.

INTRODUCTION TO THE INVENTION

Many methods are known for joining, repairing, protecting, reinforcing and otherwise modifying pipes and other substrates. In some of those methods, an insert, composed of a polymeric material which can be deformed under heat and pressure, is placed between the substrate and a heat-recoverable article comprising a conductive polymer, which, when powered, supplies the heat needed to cause recovery of the article, which in turn causes the insert to bond to the substrate. Reference may be made for example to U.S. Pat. Nos. 4,085,286, 4,177,446, and 4,421,582, and U.K. Patent No. 1,265,194, the disclosures of which are incorporated herein by reference. However, all the known methods suffer from one or more disadvantages, especially for joining pipes composed of thermoset polymers reinforced by fibers.

SUMMARY OF THE INVENTION

We have discovered that greatly improved results can be obtained in such processes through the use of a heat-recoverable article comprising a heat-recoverable element composed of a conductive polymer composition which comprises an organic polymer and, dispersed in the polymer, a particulate conductive filler, said polymer being one which retains substantial physical strength above the recovery temperature of the article (which, in the case of a crystalline polymer, is usually above its melting point). Preferred polymers of this kind are (a) organic polymer particles which have been sintered together so that the particles have coalesced without losing their identity, and (b) organic polymers which have been melt-extruded and which have a molecular weight of at least 150,000, e.g.. in the range 150,000 to 600,000. Thus in one aspect, the invention provides a method of repairing, reinforcing, joining or otherwise modifying a substrate which comprises (1) placing adjacent the substrate a heat-recoverable article as defined above,
(2) placing between the substrate and the article an insert composed of a material which undergoes a desired physical and/or chemical change when it is exposed to heat and pressure, preferably a polymeric material which can be deformed under heat pressure; and
(3) generating heat within the heat-recoverable element, thus causing the article to recover, to press the insert against the substrate, and to heat the insert so that it undergoes a desired physical or chemical change, for example so that it deforms and bonds to the substrate. Since a heat-recoverable article as defined above retains its strength above the recovery temperature, continued heating of it, after recovery, results in heat and pressure being exerted on the insert over a longer period than has previously been possible. As a result, this invention broadens the range of inserts that can be used and can increase the effectiveness of previously used inserts. For example, high temperature curing resins can be used for the first time for joining glass-fiber reinforced pipes. In some cases, the heat-recoverable article, although essential in supplying heat and pressure to the insert during the method, plays little or no subsequent part in the coupling or other modification of the substrate and can for example be removed altogether without any substantial adverse effect.

Particularly useful results are obtained when the insert is composed of a thermosettable polymeric composition, especially one which is reinforced by fibers, for example glass fibers. Such materials are well known and are often referred to as "pre-pregs". The use of a heat-recoverable article as defined makes it possible to cure the thermosettable composition while it is maintained in close and conforming contact with the substrate, and thus to ensure that it bonds very well to the substrate. Furthermore, recovery of different parts of the article can be made to take place sequentially (through different thermal loads placed on an article which generates heat uniformly and/or through generating heat in a non-uniform fashion), so that the thermosettable composition is subjected to pressure in a desired way, particularly, for example, so as to reduce or eliminate voids in the cured product.

BRIEF DESCRIPTION OF THE DRAWING

The invention is illustrated in the accompanying drawing in which

FIG. 1 is a cross-sectional view of an assembly for joining two glass-reinforced pipes, ready for use in the method of the invention, and FIG. 2 is a cross-sectional view of the same assembly after the pipes have been joined by the method of the invention.

DETAILED DESCRIPTION OF THE INVENTION

The substrate used in the present invention can be of any kind which is not damaged by the heat and pressure applied to the insert. The invention is particularly useful for substrates, in particular pipes, for example of diameter 2 to 12 inch, which are composed of a thermoset polymer, e.g.. an epoxy resin, a urea-formaldehyde resin, a melamine resin, a phenolic resin, a polyester (including polyvinyl esters) or a 1,2-vinyl polybutadiene; a high-melting thermoplastic polymer, e.g.. a nylon; a cross-linked thermoplastic polymer, e.g.. cross-linked polyethylene; or a metal; or concrete. The polymeric materials can be reinforced with fibers, e.g.. glass fibers.

The heat-recoverable article used in this invention is selected for its ability to produce the desired amount of heat and pressure while the insert is deformed and bonded to the substrate, e.g.. while a thermosettable composition is cured. Thus the conductive polymer must be able to withstand heating at the desired temperature, which may be as much as 100° C. above its melting point, for an extended length of time, e.g., at least 15 minutes and often longer, e.g., about 15-60 minutes, or even longer, up to several hours, depending on the size of the coupler and the nature and thickness of the insert, and the article must continue to provide recovery forces during this time. If the heat-recoverable article consists essentially of a heat-recoverable conductive polymer, then the polymer should be one which retains substantial physical strength above the recovery temperature, which is often above its melting point.

The term "insert" is used herein in a broad sense to include any article, whether self-supporting or in the form of a layer supported on one of the surfaces, which will undergo a desired change under heat and pressure, then produce a desired result, for example will itself bond to the substrate or will promote bonding between the substrate and the heat-recoverable article. The insert can be effective as a result of its physical and/or chemical effect at the interface, and can be for example an adhesive, including a hot-melt or heat-curable adhesive, e.g., a thermoplastic polymer; or a thermosetting resin, e.g., an epoxy resin, especially a partially cured thermosetting resin; or a cross-linking agent or other chemical activator for one or both of the surfaces; or a metal, elastomeric or fibrous member, e.g., an O-ring or other sealing member which fits into a slot in a heat-recoverable article. Depending upon the nature of the insert, it may be desirable to continue to heat a recoverable article after it has recovered, in order to effect some desired change in one or more of the insert, the substrate and the article. When the substrate and the insert are both composed of polymeric material, they are preferably compatible with each other.

The insert may be provided as a lining on the inside surface of the heat-recoverable element, but preferably it is installed separately, for example in the form of a tape which is wrapped around the substrates. We have obtained particularly good results, when joining pipes, through the use of an insert which is composed of a thermosetting polymeric material reinforced by fibers and which is in the form of a self-supporting sheet which has a trapezoidal shape when flat and is wrapped around the ends of the pipes so as to form a barrel-shaped enclosure around the ends of the pipes. Such an insert is fused and cured to provide a void-free, smooth-surfaced junction between the pipes which is extremely strong, for example providing a coupling which is stronger than the pipe itself. Such an insert is both more economical and more effective than one which has square ends.

In one embodiment of the invention, the heat generated within the heat-recoverable element causes heat-softened material from the insert to fill a gap between two or more substrates. If necessary, a support member may be included adjacent the substrates to prevent the softened material from flowing through, rather than filling, the gap between the substrates. The support member may for example have an annular groove in its outer surface to control the shape of a bead of the insert material which is forced between the pipe ends. A bead of this kind is particularly useful when joining fiber-reinforced pipes, since it seals the exposed fibers on the pipe ends, which can otherwise be a source of physical or chemical weakness. The support member may also be provided with a stop to space the substrates and provide a gap therebetween.

An important advantage of the use of an insert is that it enables joints to be made between substrates that are incompatible with the article comprising the heat-recoverable element. Also, by appropriate choice of the liner, the properties of the joint region, for example the electrical continuity of the joint, may be controlled. For example where the insulation at the ends of part of insulated electric cables has been bared to allow the cables to be electrically connected, the method may be used to join the cut back insulation. Electrical continuity or discontinuity of the joint can be achieved by appropriate selection of a conductive or non-conductive insert. For some applications an insert comprised of two materials, for example one conductive, one non-conductive, may be selected to achieve the desired properties at the joint region.

In preferred conductive polymers for use in this invention, the polymer is preferably (a) a matrix consisting essentially of organic polymer particles which have been sintered together so that the particles have coalesced without losing their identity, the particulate conductive filler being dispersed in said matrix but being present substantially only at or near the boundaries of the coalesced particles of polymer, or (b) a high molecular weight polymer, which may or may not be cross-linked, particularly polyethylene, having a molecular weight in the range 150,000 to 600,000, more preferably in the range 200,000 to 400,000. It is especially preferred to use sintered ultra high molecular weight polyethylene (UHMWPE) having a molecular weight of at least 1.5 million, preferably 2 to 4 million, e.g., at least 3 million. The advantage of such materials is that they can withstand being heated to temperatures of 100° C. or more above their melting point for long periods, e.g., as much as several hours. This behavior may be necessary where a liner of, for example, an epoxy resin having a long cure time is used. Another advantage of using sintered materials, or the cross-linked high molecular weight materials, is that they can exert high-recovery forces, of the order of several hundred psi radial pressure.

Where the insert flows under heat and pressure, the heat-shrinkable article may be arranged so that egress of softened material out of the ends of the article is prevented. This may be achieved, for example, by shaping the article so that it has internal annular grooves at each of its ends.

The heat-recoverable article may be any suitable shape depending on the nature of the substrates. In one embodiment the article is generally tubular, preferably cylindrical. Preferably the wall thickness of the article, whatever its shape, is at least 0.07 inch. The tubular article may be formed by a variety of methods, for example by moulding, extruding or sintering it directly into that shape, or by wrapping a number of overlapping layers of tape helically around a mandrel until the desired thickness of article is achieved, and then removing the mandrel. The wrapped tape may be heated before removal of the mandrel to fuse the layers of the tape together. The tape is preferably formed by extrusion.

Where the substrate is hollow, e.g., a pipe, a support member can be placed within it before the heat-recoverable article is recovered. The support member can function solely to maintain substantially the original internal dimensions of the substrate (e.g., when joining thin-walled plastic pipes which would otherwise be distorted by the coupler). Alternatively, the support member can increase the strength of the coupling by modifying the shape of the pipes, e.g. through the presence of circumferential ribs or other protuberances on the external surface of the support member or through use of a support member whose center section is of smaller size than its end sections. The support member can also provide an adhesive at the junction of the pipes and/or bond chemically to one or both of the pipes. The support member can also provide a stop against which the end(s) of the pipe(s) can be butted, or can help to align the pipes (or otherwise maintain them in a desired spatial relationship). The support member is preferably shorter than the coupler, so that if the joint is subsequently flexed, the bending forces are not concentrated at the ends of the support member. The support member can be secured to the article so as to provide one or more pockets into which the substrate(s) can be inserted.

The heat-recoverable articles used in the present invention comprise, and may consist essentially of, an element, preferably a heat-recoverable element, composed of a conductive polymer composition. Heat is generated within the conductive polymer composition, and this is preferably achieved by passing electrical current through the element. However, internal heat generation can also be achieved in other ways, e.g. by induction or microwave heating. Conductive polymer compositions are well known and comprise an organic polymer component and, dispersed in the organic polymer component, a particulate conductive filler. (The term "particulate" is used herein to include particles of any shape, including particles of high and low aspect ratios, e.g. spherical, plate-like and acicular.) The preferred particulate filler in the present invention is carbon black. The conductive polymers used in the present invention preferably have resistivities at 23° C. in the range of 0.5 to 100 ohm.cm, with particularly preferred values within this range being dependent on the composition of the conductive polymer, the dimensions of the article, the electrode placement and the power source. Where sintered conductive polymers are used the compositions preferably have resistivities in the range 1.5 to 100 ohm.cm. Preferably these factors are selected so that recovery is obtained in a relatively short time, e.g. within 10 minutes, preferably within 5 minutes. Suitable power sources include for example DC voltages of 6, 12, 24, 48 or 60 volts, for which resistivities of 0.5 to 10 ohm.cm are usually preferred, as well as voltages of 36–40, 110–120 or 220–240 volts AC, for which higher resistivities, e.g 50–100 ohm.cm, are appropriate. The preferred dimensions of the articles will of course depend on their intended use. For tubular articles, the ratio of the diameter of the article to the wall thickness is preferably less than 18:1, e.g. 2:1 to 12:1, after recovery. A relatively large wall thickness (prior to shrinkage) of at least 0.07 inch, preferably at least 0.1 inch, is often desirable in order to ensure adequate strength to resist mechanical stresses and internal pressures. It is also often desirable that the articles should continue to generate heat at a high rate even at their recovery temperature, for example to promote curing of a thermosettable polymer insert. For this reason, it is preferred that the composition should not exhibit PTC behavior at temperatures up to and slightly above (e.g. up to 50° C. above) the recovery temperature; a change in resistivity by a factor of less than 5, preferably less than 2, over the temperature range 23° C. to (TR+50)° C., where TR is the recovery temperature, is preferred.

Many conductive polymer compositions are known, and most of them are prepared by a melt-mixing process. The filler loadings needed to produce the desired levels of resistivity in melt-mixed conductive polymer compositions typically result in relatively poor physical properties. For example expansion ratios of at least 1.2 and preferably at least 1.5, which are desirable in the present invention (in order to accommodate a range of dimensions for the substrates, including eccentricity of pipes) are typically difficult to achieve at high filler loadings. We have surprisingly found that when melt processed high molecular weight polyethylene is used, having a molecular weight in the range 150,000 to 600,000, the change in the physical properties that occurs as the filler loading is increased is less than that which occurs for lower molecular weight polyethylene, and for example, expansion ratios of 1.5 may be achieved. This melt processed high molecular weight polyethylene is one preferred material for the conductive polymer composition of the present invention.

High molecular weight polyethylene conductive polymers can be prepared by dry blending or melt blending the polymer particles and the conductive filler. The quantity of conductive filler required to provide a given level of resistivity is more than for the ultrahigh molecular weight polyethylene. The high molecular weight polyethylene composition preferably contains less than 26 weight per cent, preferably less than 24 weight per cent, especially preferably 18–24 weight per cent of carbon black or other conductive filler. The preferred sintered compositions for use in this invention contain less than 9%, preferably less than 7%, particularly 2 to 6%, by volume of carbon black or other conductive filler. Care must be used in selecting the carbon black (or other filler) in order to achieve the desired level of resistivity at these loadings. We have obtained excellent results using Ketjenblack EC, available from Akzo Chemie.

The polymer used in the preferred sintered or melt-formed high molecular weight conductive polymer compositions is preferably one which maintains a relatively high viscosity at the temperature employed during the process. Accordingly it is preferred to use a polymer which, at a temperature 50° C. above its softening point, has a Melt Flow Index of less than 0.3 g/10 min, particularly less than 0.1 g/10 min especially less than 0.05 g/10 min, at a loading of 5 kg, and a Melt Flow Index of less than 3.0 g/10 min, particularly less than 1.0 g/10 min, especially less than 0.1 g/10 min, at a loading of 15 kg. Similarly, the composition in the article preferably has a high load melt index (HLMI), measured by ASTM D1238, Condition F 190/21.6, of less than 30, particularly less than 25, especially less than 20. Particularly good results have been obtained using ultra high molecular weight polyethylene (UHMWPE) especially such polyethylene having a molecular weight greater than about 1.5 million, particularly greater than about 3.0 million. In this connection reference may be made to copending, commonly assigned application Ser. No. 582,105 filed Feb. 21, 1984 (MPO907-US1), now abandoned in favor of continuation application Ser. No. 132,968 (MPO907-US2), the disclosure of which is incorporated herein by reference. Another polymer which behaves similarly when sintered is polytetrafluoroethylene (PTFE). Other polymers which can be sintered, but which are less viscous than is preferred, are polyphenylene sulfide (PPS) and polyimides.

Good results have also been obtained using melt-processed high molecular weight polymers, in particular high molecular weight polyethyene (HMWPE), especially such polyethylene having a molecular weight greater than about 150,000, particularly greater than about 200,000. In this connection reference may be made to copending, commonly assigned application Ser. No. 720,118 (MP1039-US1), the disclosure of which is incorporated herein by reference.

In one embodiment, it is preferred to cross-link the composition of the heat-recoverable element before it is expanded to render it heat-recoverable. Cross-linking may be achieved, for example, by irradiating the compositions, for example with high energy electrons or gamma rays. Various comparative tests were carried out on cross-linked and uncross-linked samples of HMWPE to illustrate the change in properties as cross-linked. The results are set out in Table 1 below:

TABLE 1

| Tensile Strength | cross-linked | 44.1 | $N/mm^2$ |
| --- | --- | --- | --- |
| | uncross-link | 31.8 | $N/mm^2$ |
| 2% modulus | cross-linked | 1000 | $N/mm^2$ |
| | uncross-linked | 813 | $N/mm^2$ |
| Ultimate elongation | cross-linked | 15% | |
| | uncross-linked | 7.8% | |
| Water absorption after 14 days | | less than 0.1% | |

Notched Impact Strength

| | 23° C. | | −40° C. | |
| --- | --- | --- | --- | --- |
| | $F_{max}$ | En. abs. | $F_{max}$ | En. abs. |
| Uncross-linked | | | | |
| After 2 hrs. at 120° C. | 169 N | 2,03 $KJ/m^2$ | | |
| After 30 days at 110° C. | 200 N | 2,28 $KJ/m^2$ | | |
| Cross-linked | | | | |
| After 2 hrs. at 120° C. | 233 N | 3,12 $KJ/m^2$ | 206 | 2,55 |
| After 30 days at 110° C. | 272 N | 3,24 $KJ/m^2$ | 241 | 1,98 |
| After 5 min. at 220° C. | 247 N | 3,64 $KJ/m^2$ | 257 | 2,99 |

As can be seen cross-linking improves all the physical properties of the material, in particular the toughness. Also where a cross-linked material is used it can be expanded above the melting point of the material, so that lower expansion forces are required than for a non cross-linked sample which must be expanded below its melting temperature. Also higher recovery forces are achieved using cross-linked materials.

The heat-recoverable element is preferably of the same composition throughout, but can be composed of different conductive polymers in different sections. The heat-recoverable element can be part or all of the conductive polymer element. The heat-recoverable element is preferably the sole heat-recoverable part of the heat-recoverable article, but the article can also include a second heat-recoverable component which is not composed of a conductive polymer. The heat-recoverable article preferably comprises a radially shrinkable tube of cylindrical or other closed cross-section, or a part of such a tube, e.g. a split cylinder, but can be of another shape, in particular a sheet which is formed into a heat-shrinkable enclosure by wrapping it around the substrate(s) and securing the wrapped ends together, or two or more parts, e.g.. half-shells, which can be secured together around a substrate. The shape and/or the resistivity of the element can be varied so as to provide a desired variation from place to place in the rate of heating and/or the recovery force and/or the residual stress exerted on the substrate.

The heat-recoverable element may comprise two or more layers. The layers may be made from the same material, but are preferably made from different materials. In a preferred embodiment one of the layers comprises an organic polymer and dispersed therein a particulate conductive filler, which layer is arranged to generate heat by the passage of current therethrough, and the other layer comprises a non conductive material selected according to the desired properties. The layer containing the conductive filler may be located within the non conductive polymeric layer, or vice versa. Where the filler loaded layer provides the inner layer of the heat recoverable element, heat to cause bonding to the underlying substrate need be provided only at the element/substrate interface. This advantageously reduces the amount of heat needed to recover the coupling. In this arrangement the outer non conductive layer may be selected from an appropriate material to act as an insulation layer, reducing the cooling effect of the environment. This further reduces the heat needed to recover the element, and also makes the quantity of heat required more independent of the ambient temperature. The outer layer may also, or instead, act as a support or reinforcing layer, for example, it may be made from a tougher material than the inner, filled, conductive layer, to improve the impact properties of the element. In the reverse arrangement, where the non conductive polymeric layer is located within the layer containing conductive filler, the inner non conductive layer is advantageously selected to be compatible with the underlying substrate so as to form a good bond thereto. The inner layer may, for example, comprise a non cross-linked polymer which will readily flow and fuse to the underlying substrate. For example in the case of coupling polyethylene pipes the inner layer may comprises non cross-linked polyethylene.

The double or multilayer heat recoverable element may be made by any suitable fabrication technique. For example the layer may be coextruded or comolded and then the formed double or multi layer element preferably expanded as a whole. Where the element is made by tape wrapping, tapes of two or more different materials may be used. Preferably one tape comprises a conductive polymeric materials and the other tape comprises a non conductive material. In arrangements where the inner layer (which is the most expanded layer in a tubular construction) is a non conductive polymeric layer, it preferably comprises a unfilled polymeric material such that it can withstand high expansion ratios. With such an arrangement very high expansion ratios of the order of 1.5 can be achieved.

Where extrusion is used to make the heat-recoverable element, a variety of electroding arrangements may be used. For example an array of axially extending electrodes may be used and the conductive polymer extruded thereover. Alternatively annular electrodes may be positioned at the ends of the element.

In many cases, it is desirable or necessary, in order to obtain the desired degree of heat-recovery, that the conductive polymer should be cross-linked, preferably by irradiation, e.g. to a dose of 3 to 20 Mrads. When fusion between the conductive polymer and the substrate is desired, the degree of cross-linking should be selected to permit this. When using high molecular weight polyethylene or sintered UHMWPE conductive polymer compositions, however, cross-linking is often not essential.

Any appropriate electroding means can be used to ensure satisfactory current flow through the conductive polymer. Thus electrodes can be incorporated into the conductive polymer during its shaping or can be applied to the exterior surface of the shaped element, bearing in mind that the electrodes must be placed so that they do not need to change shape during recovery of the element or must accommodate to the changing shape of the element as it recovers. Excellent results have been obtained by painting electrodes onto the ends of a tubular element (using, for example, commercially available paints containing silver), and making use of spring-loaded electrical leads which maintain contact with the silver paint electrodes as the element recovers. It is also possible to have recesses in the conductive polymer element and to plug electrical connectors, attached to flexible leads, into these recesses, using painted electrodes to spread the current if desired or necessary. By appropriate electroding arrangements, current can be caused to flow from end to end of the article or through the thickness thereof.

One suitable electroding system is disclosed in U.S. Pat. No. 4,570,055, the disclosure of which is incorporated herein by reference, wherein the electrodes are arranged to change their shape and size as the element recovers to maintain electrical integrity at the interface between the electrodes and the element.

The heat-recoverable element may comprise means for controlling optimum recovery conditions. Such means are disclosed, for example in U.S. Pat. No. 4,575,618 and copending, commonly assigned U.S. Ser. No. 634,242 (MP0949), now U.S. Pat. No. 4,686,071, the disclosures of which are incorporated herein by reference.

Referring now to the drawing, FIG. 1 shows an assembly for joining together, end to end, two glass-reinforced pipes 1 and 2. The assembly includes coupler 3 which comprises a radially heat-shrinkable element 31 composed of a sintered mixture of UHMWPE particles and carbon black, and silver paint electrodes 32 and 33 on the ends of the element 31. Before making the assembly shown in FIG. 1, the coupler is placed over one of the pipes and slid down the pipe. The pipes are then aligned as shown in the drawing using a jig (not shown). A trapezoid-shaped sheet 4 of a glass-fiber-reinforced pre-preg epoxy resin is then wrapped around the ends of the pipes, broad end first, to form a generally barrel-shaped wrapping as shown. The coupler is slid back over the joint to form the assembly shown in FIG. 1. Electrical current is then passed through the element 31 by means of spring leads (not shown) attached to the silver electrodes 32 and 33. The coupler warms up and shrinks, shrinkage beginning at the middle of the coupler (where it loses the least heat) and proceeding outwards, thus squeezing and curing the pre-preg sheet progressively from the middle to the ends. Heating of the coupler is maintained, either continuously or intermittently, after it has shrunk, until the pre-preg wrapping has been completely consolidated and cured. The resulting finished joint is shown in FIG. 2. It will be noted that the wrappings of the pre-preg sheet can no longer be discerned and that part of the pre-preg sheet has been squeezed between the ends of the pipes to form a bead 41 which encloses and protects the exposed end of the pipes.

The invention is illustrated by the following Example.

EXAMPLE

The procedure described above with reference to the drawing was followed. The pipes had an external diameter of about 2.4 inch and were composed of an epoxy resin with wound fiberglass reinforcement therein; they were supplied by Ameron Inc. under the trade name Bondstrand 2000. Relatively short lengths of the pipes were used so that the interior of the pipes could be observed during the procedure. To provide the pipes with a uniform exterior surface in the joint area, the end of each pipe (over a length of about 1.6 inch) was shaved in a lathe to an outer diameter of about 2.39 inch, and then sanded and cleaned. The pre-preg sheet was cut from a fiberglass fabric impregnated with a partially cured epoxy resin, supplied by Hexce Inc. under the trade name 7585/F-445; the sheet had a trapezoid shape having a base width of about 3.2 inch, a top width of about 1 inch, and a height of about 60 inch. When the sheet had been wrapped around the pipe ends, there were six or seven layers of the sheet at the center of the wrapping. The coupler was composed of a ram-extruded an sintered mixture of 95% by volume of UHMWPE particles (Hostalen GuR413 from American Hoechst) and 5% by volume of carbon black (Ketjenblack EC from Akzo Chemie). The ram extrudate was machined into a hollow cylinder having an inner diameter of about 2.2 inch, an outer diameter of about 3.0 inch, and a length of 4 inch. This cylinder was then rendered heat-shrinkable by heating it to 130° C., expanding it to an inner diameter of about 2.8 inch using a conical mandrel and cooling it in the expanded configuration. Silver electrodes were painted on the ends of the expanded cylinder; the resistance between the electrodes was about 2 ohm.

After making up an assembly as shown in FIG. 1, the silver electrodes were connected to a 30 volt DC power supply by means of copper braid wires contained in circular springs. After about 4 minutes the coupler started to shrink, beginning at the center and working its way out to the ends. By turning the power on and off, a temperature of about 180° C. (measured by means of a thermocouple) was maintained at the interface between the coupler and the epoxy resin wrapping for another 20 minutes, after which the assembly was allowed to cool. After about 10 minutes at 180° C. the epoxy resin bead 41 shown in FIG. 2 formed. A small amount of the epoxy resin was also squeezed out of the ends of the coupler during the heating.

The cooled coupling was pressure tested, and it was found that the pipe wall failed (at a pressure of about 3400 psi) before the coupling. The coupling was then sectioned, so that the interior could be examined, and it was found that the cured epoxy was solid and extremely well compacted, with a void content of less than 2% by volume.

We claim:

1. A method of modifying a substrate, which method comprises
    (1) placing adjacent to the substrate a heat-recoverable article comprising a heat-recoverable element, the heat-recoverable element being at least 0.1 inch thick, having a recovery temperature TR, and being composed of a conductive polymer composition which (a) comprises (i) a matrix consisting essentially of organic polymer particles which have been sintered together so that the particles have coalesced without losing their identity, and (ii) a particulate conductive filler which is dispersed in said matrix but is present substantially only at or near the boundaries of the coalesced particles; and (b) increases in resistivity by a factor of less than 5 over the temperature range 23° C. to $(TR+50)$° C.;

(2) placing between the substrate and the article an insert which is in the form of a self-supporting sheet and which comprises a thermosetting resin;

(3) generating heat within the heat-recoverable element by passing electrical current therethrough, thus causing the article to recover into contact with the insert; and (4) continuing to generate heat within said element by passing electrical current therethrough after the heat-recoverable article has recovered into contact with the insert, thus pressing the insert against the substrate and heating the insert so that the thermosetting resin is cured while the insert conforms to and is pressed against the substrate, thus bonding the insert to the substrate.

2. A method according to claim 1 wherein the insert is wrapped around the substrate before the heat-recoverable article is placed adjacent thereto.

3. A method according to claim 2 wherein the insert is composed of a partially cured thermosetting resin reinforced by fibers.

4. A method according to claim 2 which comprises joining two pipes in line, at least one of the pipes being composed of a thermoset polymer reinforced by fibers, and wherein the heat-recoverable element is a radially heat-shrinkable hollow cylinder.

5. A method according to claim 2 which comprises joining two pipes in line, wherein the heat-recoverable element is a radially heat-shrinkable hollow cylinder, and wherein the insert is in the form of a self-supporting sheet which comprises a fabric impregnated with a partially cured thermosetting resin, which has a trapezoidal shape when flat, and which is wrapped around the ends of the pipes so as to form a barrel-shaped enclosure around the ends of the pipes.

6. A method according to claim 5 wherein the heat-recoverable element recovers sequentially from the middle to the ends.

7. A method according to claim 1 wherein heat is generated within the heat-shrinkable element by passing electrical current axially therethrough, and the conductive polymer composition has a resistivity at 23° C. of 1 to 100 ohm.cm and contains less than 9% by volume of a particulate conductive filler.

8. A method according to claim 1 wherein the matrix consists essentially of particles of ultra high molecular weight polyethylene and the conductive polymer composition contains 2 to 6% by volume of carbon black.

9. A method according to claim 1 wherein each of the pipes is composed of a thermoset polymer which is reinforced by glass fibers.

10. A method according to claim 1 wherein the insert is composed of a partially cured epoxy resin reinforced by glass fibers.

11. A method according to claim 1 wherein the conductive polymer increases in resistivity by a factor of less than 2 over the temperature range 23° C. to $(TR+50)°$ C., where TR is the recovery temperature.

12. A method according to claim 1 wherein said heat-recoverable article consists essentially of the heat-recoverable element and electrodes secured thereto.

13. A method according to claim 12 wherein the heat-recoverable element is a cylindrical radially heat-shrinkable article and the electrodes are annular electrodes positioned at the ends of the heat-recoverable element.

14. A method of modifying a substrate, which method comprises (1) placing adjacent to the substrate a heat-recoverable article comprising a melt-shaped heat-recoverable element, the heat-recoverable element being at least 0.1 inch thick, having a recovery temperature TR, and being composed of a conductive polymer composition which (a) comprises (i) an organic polymer having a molecular weight of at least 50,000 and (ii), dispersed in the polymer, a particulate conductive filler; and (b) increases in resistivity by a factor of less than 5 over the temperature range 23° C. to $(TR+50)°C.$;

(2) placing between the substrate and the article an insert which is in the form of a self-supporting sheet and which comprises a thermosetting resin;

(3) generating heat within the heat-recoverable element by passing electrical current therethrough, thus causing the element to recover into contact with the insert; and (4) continuing to generate heat within said element by passing electrical current therethrough after the heat-recoverable article has recovered into contact with the insert, thus pressing the insert against the substrate and heating the insert so that the thermosetting resin is cured while the insert conforms to and is pressed against the substrate, thus bonding the insert to the substrate.

15. A method according to claim 14 wherein the insert is composed of a partially cured thermosetting resin reinforced by fibers and is wrapped around the substrate before the heat-recoverable article is placed adjacent thereto.

16. A method according to claim 14 which comprises joining two pipes in line, at least one of the pipes being composed of a thermoset polymer reinforced by fibers, and wherein the heat-recoverable element is a radially heat-shrinkable hollow cylinder.

17. A method according to claim 16 which comprises joining two pipes in line, wherein the heat-recoverable element is a radially heat-shrinkable hollow cylinder, and wherein the insert is in the form of a self-supporting sheet which comprises a fabric impregnated with a partially cured thermosetting resin, which has a trapezoidal shape when flat, and which is wrapped around the ends of the pipes so as to form a barrel-shaped enclosure around the ends of the pipes.

18. A method according to claim 17 wherein the heat-recoverable article recovers sequentially from the middle to the ends.

19. A method according to claim 14 wherein heat is generated within the heat-shrinkable article by passing electrical current axially therethrough, and the conductive polymer composition has a resistivity at 23° C. of 1 to 100 ohm-cm and contains less than 26% by volume of a particulate conductive filler.

20. A method according to claim 16 wherein each of the pipes is composed of a thermoset polymer which is reinforced by glass fibers.

21. A method according to claim 16 wherein the organic polymer has a molecular weight in the range 200,000 to 400,000, and the conductive filler comprises carbon black.

22. A method according to claim 14 wherein the conductive polymer composition increases in resistivity by a factor of less than 2 over the temperature range 23° C. to $(TR+50)°$ C.

23. A method according to claim 14 wherein the conductive polymer composition has a high load melt index, measured by ASTM D1238 Condition F 190/21.6, of less than 25.

24. A method according to claim 23 wherein the conductive polymer composition has a high load melt index of less than 20.

25. A method according to claim 14 wherein the conductive polymer composition has been cross-linked.

26. A method according to claim 14 wherein said heat-recoverable article consists essentially of the heat-recoverable element and electrodes secured thereto.

27. A method according to claim 26 wherein the heat-recoverable element is a cylindrical radially heat-shrinkable article and the electrodes are annular electrodes positioned at the ends of the heat-recoverable element.

* * * * *